United States Patent
Akado (10) Patent No.: US 12,135,908 B2
(45) Date of Patent: Nov. 5, 2024

(54) INFORMATION PROCESSING APPARATUS AND METHOD OF CONTROLLING INFORMATION PROCESSING APPARATUS FOR PRINTING FROM AN AUTOMATIC PRINT FOLDER

(71) Applicant: CANON KABUSHIKI KAISHA, Tokyo (JP)

(72) Inventor: Yukinobu Akado, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/298,155

(22) Filed: Apr. 10, 2023

(65) Prior Publication Data
US 2023/0367529 A1    Nov. 16, 2023

(30) Foreign Application Priority Data

May 10, 2022    (JP) .................................. 2022-077297

(51) Int. Cl.
*G06F 3/12*    (2006.01)

(52) U.S. Cl.
CPC ............ *G06F 3/127* (2013.01); *G06F 3/1205* (2013.01); *G06F 3/121* (2013.01); *G06F 3/1252* (2013.01)

(58) Field of Classification Search
None
See application file for complete search history.

(56) References Cited

U.S. PATENT DOCUMENTS

| 10,789,031 | B2* | 9/2020 | Iida | G06F 3/1204 |
| 2006/0176498 | A1* | 8/2006 | Wada | G06F 3/1253 |
| | | | | 358/1.13 |
| 2008/0297833 | A1* | 12/2008 | Hatakeyama | G06F 3/127 |
| | | | | 358/1.9 |
| 2009/0195831 | A1* | 8/2009 | Terao | G06F 21/608 |
| | | | | 358/1.15 |
| 2022/0137889 | A1* | 5/2022 | Akado | G06F 3/1285 |
| | | | | 358/1.15 |

FOREIGN PATENT DOCUMENTS

JP    2020095606 A    6/2020

* cited by examiner

*Primary Examiner* — Miya J Cato
(74) *Attorney, Agent, or Firm* — Canon U.S.A., Inc. IP Division (57) ABSTRACT

A method of controlling an information processing apparatus includes enabling one of a first setting and a second setting based on user operation. The first setting allows, in a case where content of at least one of a plurality of print setting items set to a predetermined folder is first content, and content corresponding to acquired information about an image forming apparatus and corresponding to the at least one print setting item is second content different from the first content, the image forming apparatus to perform printing based on the second content and based on the file in the predetermined folder.

16 Claims, 11 Drawing Sheets

| ID | PRINTER NAME | SHEET FEEDING PORT | SHEET WIDTH | SHEET TYPE | SHEET CATEGORY |
|---|---|---|---|---|---|
| ID-A | PRINTER 1 | ROLL 1 | 24 INCHES | REGULAR PAPER A | REGULAR PAPER |
| ID-B | PRINTER 1 | ROLL 2 | 36 INCHES | COATED PAPER | COATED PAPER |
| ID-D | PRINTER 2 | ROLL 1 | 24 INCHES | REGULAR PAPER A | REGULAR PAPER |
| ID-E | PRINTER 3 | ROLL 2 | 36 INCHES | COATED PAPER | COATED PAPER |
| ID-F | PRINTER 4 | CUT PAPER | A2 | REGULAR PAPER C | REGULAR PAPER |

| HOT FOLDER NAME | PRINTER NAME | SHEET FEEDING PORT | SHEET WIDTH | SHEET TYPE | SHEET CATEGORY | HOT FOLDER PATH | ALLOWABLE RANGE EXPANSION FLAG |
|---|---|---|---|---|---|---|---|
| HF-A | PRINTER 1 | ROLL 1 | 24 INCHES | REGULAR PAPER B | REGULAR PAPER | D:\HF\HF-A | ON |
| HF-B | PRINTER 2 | ROLL 2 | 36 INCHES | COATED PAPER | COATED PAPER | D:\HF\HF-B | |
| HF-C | PRINTER 3 | CUT PAPER | A2 | REGULAR PAPER C | REGULAR PAPER | D:\HF\HF-C | |

INFORMATION PROCESSING APPARATUS AND METHOD OF CONTROLLING INFORMATION PROCESSING APPARATUS FOR PRINTING FROM AN AUTOMATIC PRINT FOLDER

BACKGROUND

Field of the Disclosure

The present disclosure relates to an information processing apparatus, a method of controlling the information processing apparatus, and a storage medium.

Description of the Related Art

There is a printing technique for automatically printing, in response to movement/copy of a file to a preset folder, the file in the folder. In the printing technique, an automatic print folder (hereinafter, "hot folder") is created by designating a printer high in use frequency and print settings of the printer in advance, and the file is automatically printed only by dropping the file into the folder. This technique is known as a technique high in convenience. In the hot folder printing, the file in the folder is printed based on the settings made at the time when the hot folder is created. However, in a case where information on the printer as an output destination and the settings of the hot folder are compared, and the settings are not coincident with each other (e.g., in case where sheet types are not coincident with each other), an error occurs and the printing cannot be performed. In a case where the printing cannot be performed, a user changes the settings of the hot folder or newly create another hot folder every time.

Normally, in a case where printing is performed from an application, a user can check a print preview or the like to confirm a print result in advance, and then execute the printing. In a case of the hot folder printing in which the printing is automatically performed by only dropping a file into the hot folder, however, a user cannot check a print result before the printing is performed, which creates an issue that it is difficult to assume the cause of a print failure. It is desirable to suppress print failures as much as possible. Thus, it has been considered that many hot folders are created in advance to cover various print settings, thereby reducing print failures. Japanese Patent Application Laid-Open No. 2020-95606 discusses a technique for efficiently creating hot folders of many patterns with less labor in order to prevent print failures. More specifically, Japanese Patent Application Laid-Open No. 2020-95606 discusses a technique in which a plurality of settings is set in advance to a plurality of sub-hot folders associated with a parent hot folder into which a file is dropped by a user. In the technique discussed in Japanese Patent Application Laid-Open No. 2020-95606, a sub-hot folder into which the file is sorted is determined based on key information obtained from the input file. Since the settings of the sub-hot folder are not always coincident with printer information, the technique cannot serve as a means to prevent print failures. Further, in a case where the configuration of a printer is changed, it is necessary to change all of the settings of the parent hot folder and the sub-hot folders, which complicates the management of the folders.

SUMMARY

The present disclosure is directed to a system that can perform printing from an automatic print folder (hot folder) in a case where print settings of the hot folder is not coincident with the state of an image forming apparatus but the non-coincidence is within an allowable range.

According to an aspect of the present disclosure, a method of controlling an information processing apparatus, the method includes setting content of a plurality of print setting items to a predetermined folder, acquiring information about an image forming apparatus, performing processing to cause the image forming apparatus to perform printing based on the content of the plurality of print setting items set to the predetermined folder and based on a file in the predetermined folder, and enabling one of a first setting and a second setting based on user operation, wherein the first setting allows, in a case where content of at least one of the plurality of print setting items set to the predetermined folder is first content, and content corresponding to the acquired information about the image forming apparatus and corresponding to the at least one print setting item is second content different from the first content, the image forming apparatus to perform printing based on the second content and based on the file in the predetermined folder, and the second setting does not allow, in a case where the content of the at least one print setting item is the first content, and the content corresponding to the acquired information about the image forming apparatus and corresponding to the at least one print setting item is the second content, the image forming apparatus to perform the printing based on the second content and based on the file in the predetermined folder.

Further features of the present disclosure will become apparent from the following description of exemplary embodiments with reference to the attached drawings.

DESCRIPTION OF THE EMBODIMENTS

Some exemplary embodiments of the present disclosure are described in detail below with reference to accompanying drawings. The following embodiments do not limit the present disclosure according to the claims, and not all of the combinations of features described in the exemplary embodiments are necessarily essential for a means for solving the problems in the present disclosure.

Overall Configuration of System

Figure 1:
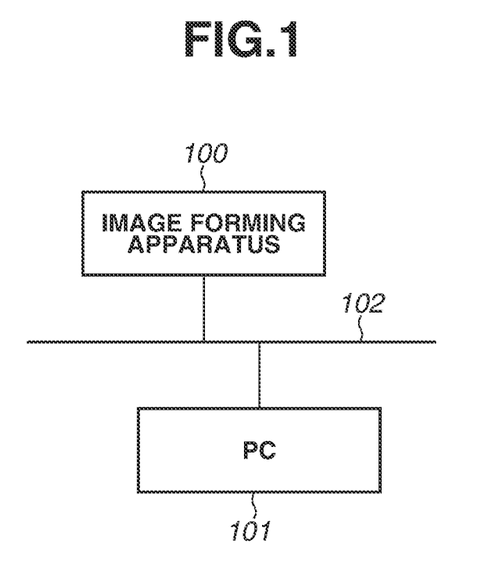
FIG. 1 is a diagram illustrating a network configuration of a printing system including an image forming apparatus.

FIG. 1 is a diagram illustrating an example of a system configuration in a network environment of a system. As illustrated in FIG. 1, an image forming apparatus 100 can communicate with a personal computer (PC) 101 serving as an information processing apparatus via a network 102. The PC 101 can acquire a width of a sheet fed to the image forming apparatus 100 and cause the image forming apparatus 100 to perform printing. In a first exemplary embodiment, one image forming apparatuses is provided; however, the number of image forming apparatuses is not limited thereto, and two or more image forming apparatuses may be provided. Likewise, one PC as the information processing apparatus is provided: however, two or more PCs may be provided. Further, the system may include only the image forming apparatus as long as the functions of the PC are incorporated in the image forming apparatus.

Hardware Configuration of Image Forming Apparatus

Figure 2:
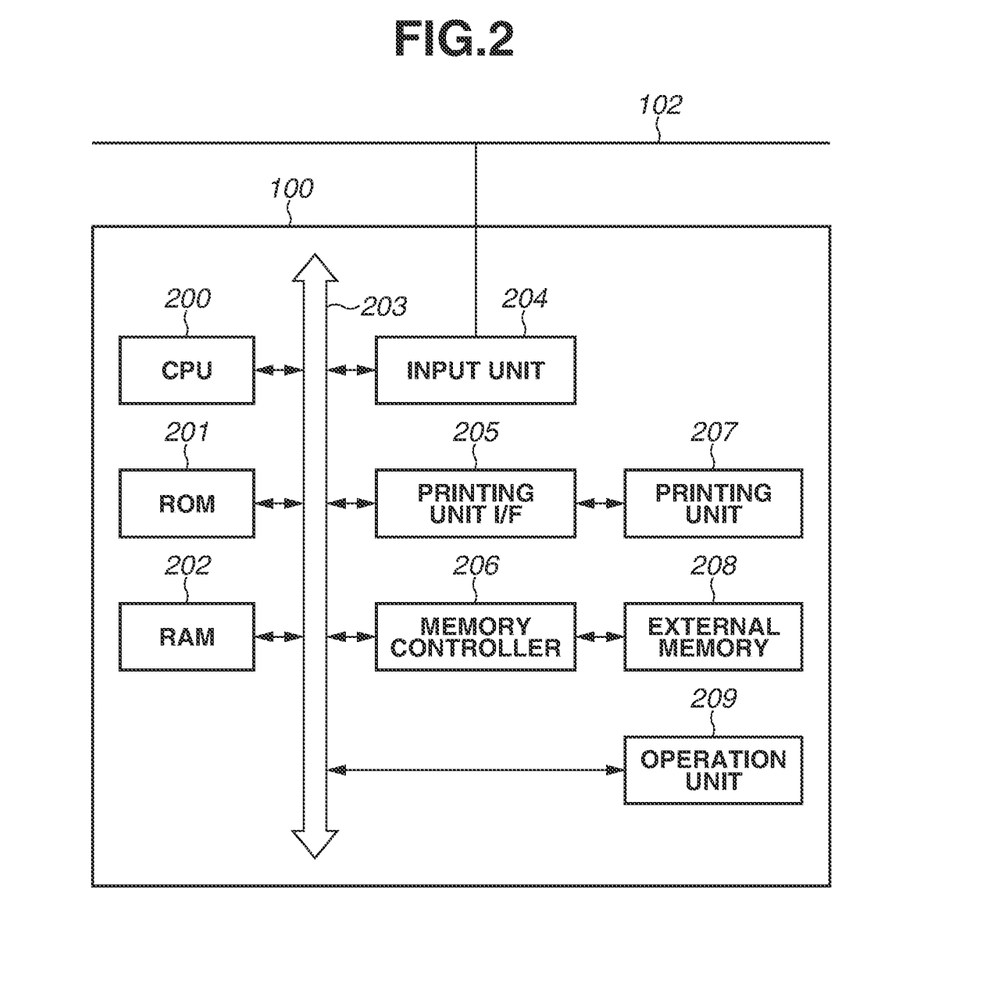
FIG. 2 is a diagram illustrating a hardware configuration of the image forming apparatus.

FIG. 2 is a diagram illustrating an example of a hardware configuration of the image forming apparatus 100. The image forming apparatus 100 includes a central processing unit (CPU) 200, a read only memory (ROM) 201, a random access memory (RAM) 202, an input unit 204, a printing unit interface (I/F) 205, a memory controller 206, and an operation unit 209, and these units exchange information via a connected system bus 203. The image forming apparatus 100 further includes a printing unit 207 and an external memory 208. The printing unit 207 and the external memory 208 are connected to the system bus 203 via the printing unit I/F 205 and the memory controller 206, respectively, and exchange information with the CPU 200.

The image forming apparatus 100 is controlled by the CPU 200. The CPU 200 operates based on a control program stored in a program ROM of the ROM 201, or a control program stored in the external memory 208. The CPU 200 outputs output information, i.e., an image signal, to the printing unit 207 that serves as a printer engine connected to the printing unit I/F 205 via the system bus 203.

The CPU 200 can communicate with the PC 101 via the input unit 204, and notifies the PC 101 of information held inside the image forming apparatus 100. Further, the CPU 200 receives, via the input unit 204, output data to be output to the printing unit 207.

The RAM 202 functions as a main memory and a work area for the CPU 200, and the memory capacity of the RAM 202 can be expanded by connecting an optional RAM to an expansion port (not illustrated). The RAM 202 is used as an output information rendering area, an environmental data storage area, and the like.

Access to the external memory 208 such as a hard disk drive (HDD) and an integrated circuit (IC) card is controlled by the memory controller 206. The external memory 208 can be optionally connected to the image forming apparatus 100, and stores font data, an emulation program, form data, information about a sheet registered with the image forming apparatus 100, attribute information about the sheet, and the like.

The operation unit 209 includes a panel, and can display various kinds of information thereon.

Hardware Configuration of PC

Figure 3:
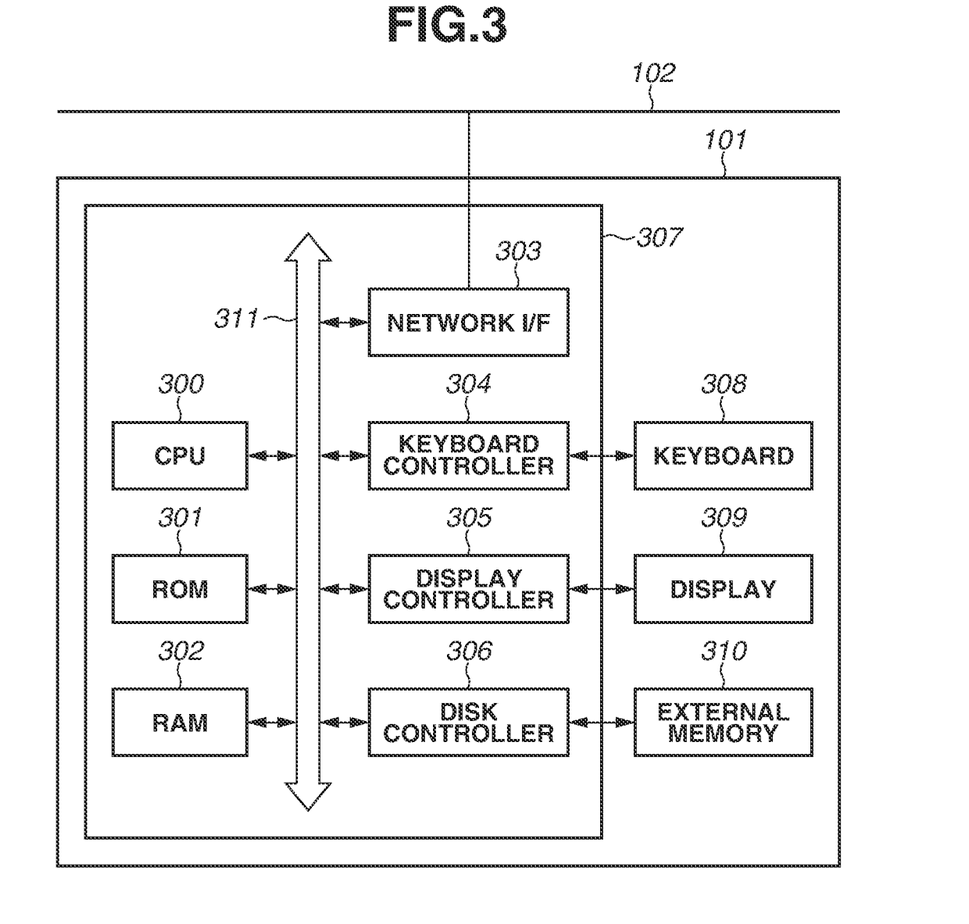
FIG. 3 is a diagram illustrating a hardware configuration of a personal computer (PC).

FIG. 3 is a block diagram illustrating a configuration of the PC 101 serving as an information processing apparatus illustrated in FIG. 1. A control unit 307 includes a CPU 300, a ROM 301, a RAM 302, a network I/F 303, a keyboard controller 304, a display controller 305, and a disk controller 306.

The CPU 300 reads out various kinds of programs, such as a control program, a system program, and an application program, from an external memory 310 via the disk controller 306 and loads the read programs to the RAM 302. The CPU 300 executes the various kinds of programs read out and loaded to the RAM 302, thereby performing various kinds of data processing and display control of a display 309. The CPU 300 may read out a control program and the like from the ROM 301 and execute the read program. The CPU 300 may be a dedicated circuit such as application specific integrated circuits (ASIC). The CPU 300 and the dedicated circuit are described as examples of a hardware circuit and a hardware processor, and the hardware circuit and the hardware processor may be other than the above.

The disk controller 306 controls access to the external memory 310 such as an HDD, a compact disc-read only memory (CD-ROM), a digital versatile disc-read only memory (DVD-ROM), a universal serial bus (USB) memory, and a magneto-optical (MO) disk.

The capacity of the RAM 302 can be expanded by an optional RAM (not illustrated) or the like, and is mainly used as a work area for the CPU 300.

The keyboard controller 304 controls key input from a keyboard 308 and a pointing device (not illustrated).

The display controller 305 controls display of the display 309.

Further, the CPU 300 can communicate with the image forming apparatus 100 via the network I/F 303.

In the exemplary embodiments of the present disclosure, the CPU 300 comprehensively controls the units connected via a main bus 311, unless otherwise noted.

Functional Block Configurations of PC and Image Forming Apparatus

Figure 4:
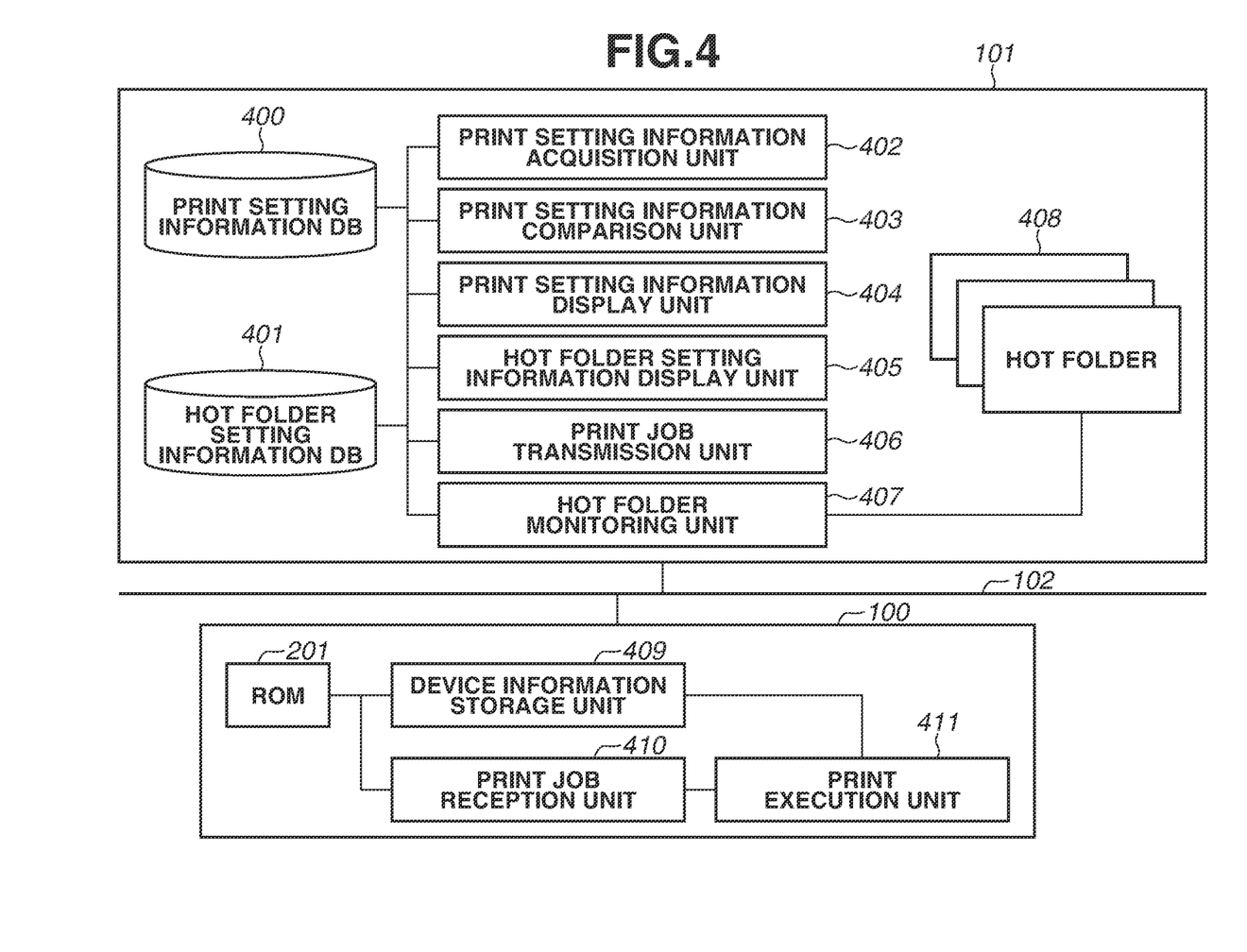
FIG. 4 is a functional block diagram of the printing system including the image forming apparatus.

FIG. 4 is a diagram illustrating software functional blocks of the system including the image forming apparatus 100 and the PC 101 serving as the information processing apparatus described with reference to FIG. 1 to FIG. 3.

The functions of the image forming apparatus 100 and the PC 101 are implemented when the CPUs 200 and 300 load programs stored in the storage units to the RAMs and execute the programs.

Image Forming Apparatus

First, the functional blocks in the image forming apparatus 100 are described.

The image forming apparatus 100 includes a device information storage unit 409 serving as a storage area, and a print job reception unit 410 and a print execution unit 411 of which the functions are implemented when the CPU 200 executes the stored programs.

The device information storage unit 409 stores status information on the image forming apparatus 100 on which a sheet feeding state and a device setting state are reflected.

The print job reception unit 410 receives a print job transmitted from the PC 101, and checks consistency with the information stored in the device information storage unit 409. When there is no problem with the print job, the print job reception unit 410 passes the print job to the print execution unit 411.

The print execution unit 411 performs print processing of the received print job.

PC

Next, the functional blocks in the PC 101 are described. Databases 400 and 401 and units 402 to 407 to be described below are a part of the function of an application program that performs printing in cooperation with a printer driver.

First, a print setting information acquisition unit 402 acquires the status information on the image forming apparatus 100 from the device information storage unit 409 of the image forming apparatus 100.

A print setting information database (DB) 400 stores the status information on the image forming apparatus 100 acquired by the print setting information acquisition unit 402, and information acquired from the printer driver and an operating system (OS) of the PC 101.

A print setting information display unit 404 displays a print setting information display screen based on the print setting information stored in the print setting information DB 400, and stores print setting values edited on the screen, in the print setting information DB 400. Further, the print setting information display unit 404 requests a print job transmission unit 406 to create and transmit a print job.

A print setting information comparison unit 403 compares the status information on the image forming apparatus 100 stored in the print setting information DB 400 with the print setting values, and requests the print setting information display unit 404 to display warning information based on the comparison result.

A hot folder setting information display unit 405 displays the information acquired from the print setting information DB 400, and folder path information on a hot folder 408 that is an automatic printing folder monitored by a hot folder monitoring unit 407. Further, the hot folder setting information display unit 405 stores any changed content in a hot folder setting information DB 401.

The hot folder monitoring unit 407 monitors a state of the hot folder 408 that is the automatic printing folder, based on the information stored in the hot folder setting information DB 401. In a case where presence of a new file or a new folder is confirmed in the hot folder 408, the hot folder monitoring unit 407 requests the print job transmission unit 406 to create and transmit a print job.

Print Setting Information DB

Figure 5:
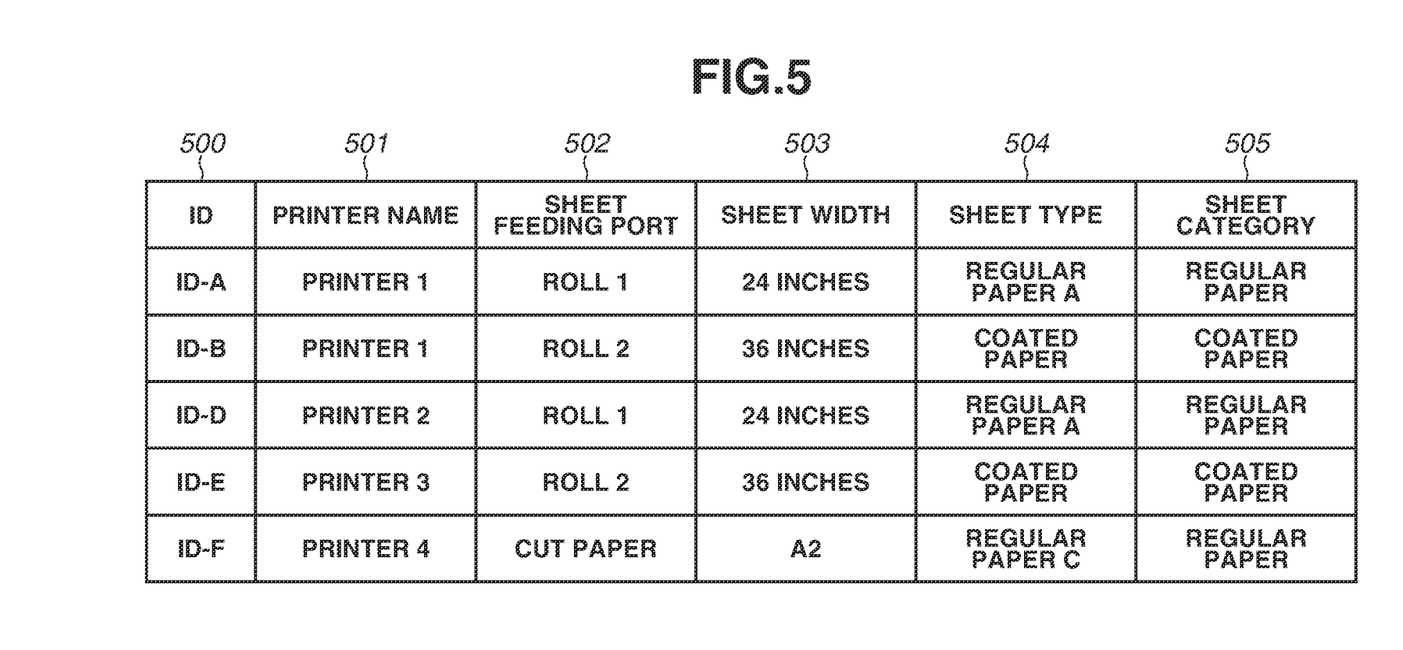
FIG. 5 illustrates an example of information stored in a print setting information database (DB).

FIG. 5 is a diagram illustrating an example of the print setting information stored in the print setting information DB 400. The print setting information includes items of an identification (ID) 500 for unique identification of the print setting information, a printer name 501, a sheet feeding port 502, a sheet width 503, a sheet type 504, and a sheet category 505. The print setting values edited on the print setting information display screen are stored in the items of the printer name 501, the sheet feeding port 502, the sheet width 503, the sheet type 504, and the sheet category 505. In this example, only four types of print setting items, i.e., the sheet feeding port 502, the sheet width 503, the sheet type 504 and the sheet category 505, are described; however, the items may be increased depending on the types of setting items. Further, the print setting information may be managed in different files for respective types of parameters, or types of parameters other than the above may be included in the print setting information.

Display Screen on Print Setting Information Display Unit

Figure 6:
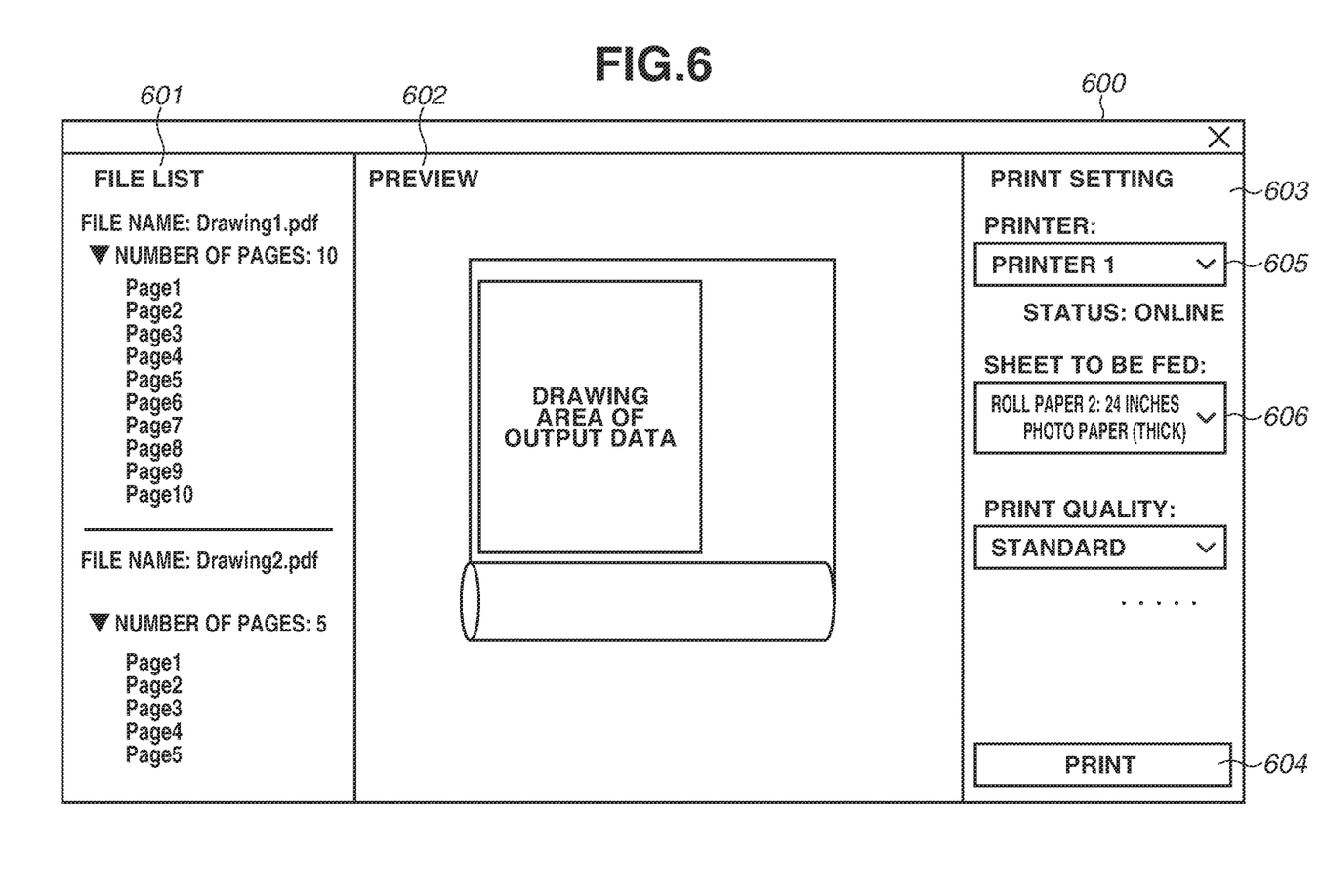
FIG. 6 is a diagram illustrating an example of a print setting information display screen on the PC.

FIG. 6 illustrates an example of a display screen 600 relating to the image forming apparatus 100 displayed by the print setting information display unit 404 on the display 309 of the PC 101. The display screen 600 includes a file list display field 601 where document information to be printed is displayed in a list form in units of documents or pages, and a preview display field 602 where a preview of the layout of a page selected in the file list display field 601 is displayed. The display screen 600 further includes a print setting display field 603 for editing the setting values of the respective items (501 to 505) stored in the print setting information DB 400. The print setting display field 603 includes a printer selection field 605 and a feeding sheet information selection field 606. Only the print setting display field 603 may be displayed, and any display field other than the above may be presented on this screen. When a "print" button 604 is pressed, creation and transmission of a print job are performed.

Hot Folder Setting Display Screen

Figure 7:
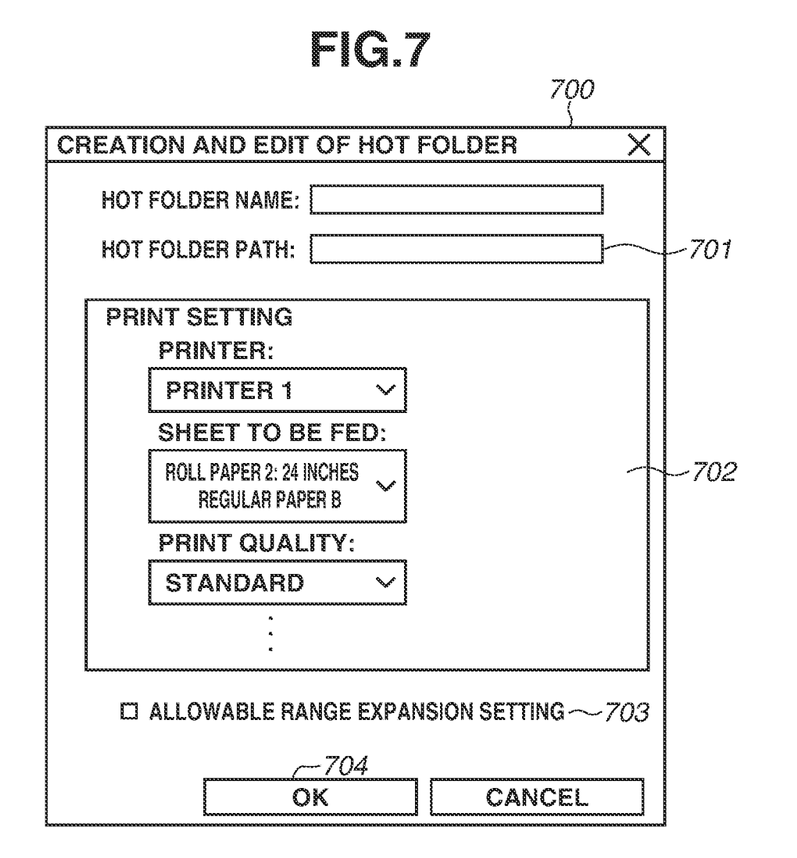
FIG. 7 is a diagram illustrating an example of a hot folder setting display screen on the PC.

FIG. 7 illustrates an example of a hot folder setting display screen 700 relating to the image forming apparatus 100 displayed by the hot folder setting information display unit 405 on the display 309 of the PC 101.

An item of a hot folder name is present on the uppermost part.

An item of folder pass information 701 is an item relating to a path of the hot folder 408 monitored by the hot folder monitoring unit 407.

A group of print setting 702 includes a plurality of print setting items such as a printer, a sheet to be fed, and print quality, applied in a case where printing is performed based on a print job transmitted from the print job transmission unit 406. In this example, these items are each illustrated in a format of a drop-down list; however, the format is not limited thereto.

Figure 9:
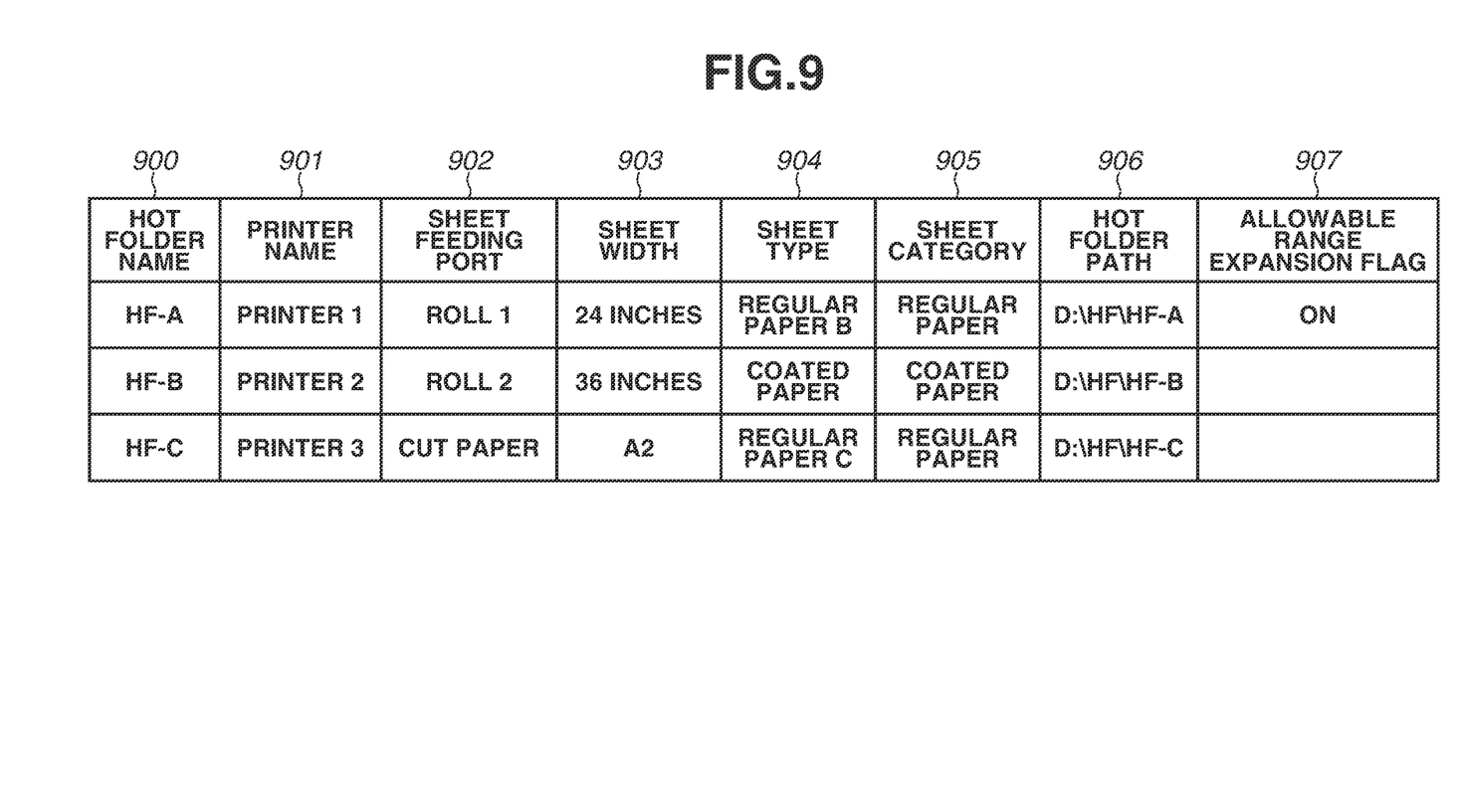
FIG. 9 illustrates an example of information stored in a hot holder setting information DB.

An item of allowable range expansion setting 703 is an item to, if the information in the print setting 702 applied in the case where printing is performed based on the print job transmitted from the print job transmission unit 406 does not coincide with the information about the printer and the sheet to be fed stored in the print setting information DB 400, allow a user to change the setting information in the print setting 702 to execute printing. The item of the allowable range expansion setting 703 is in a check box form in this example; however, the format is not limited thereto. When the allowable range expansion setting 703 is enabled, an allowable range expansion flag 907 of the corresponding hot folder in the hot folder setting information DB 401 is turned on (FIG. 9). When the allowable range expansion setting 703 is turned on, even in a case where the setting value stored in the print setting information DB 400 is not coincident with the setting value stored in the hot folder setting information DB 401, the printing is performable as long as the setting value is within the allowable range. In a case of "sheet type", for example, even in a case where the sheet type 504 stored in the print setting information DB 400 and a sheet type 904 stored in the hot folder setting information DB 401 are not coincident with each other, the printing is performable as long as the sheet category 505 and a sheet category 905 indicating the allowable range are coincident with each other. In this case, if the print job is created and transmitted by the print job transmission unit 406, the content of the sheet type 504 is designated as the sheet type information in the print setting 702 in a case where printing is performed based on the print job transmitted from the print job transmission unit 406, printing becomes performable. The setting value used for comparison is not limited to the sheet type and may be the setting value of the other item, or a plurality of setting values may be combined. The setting items to be compared and the allowable range thereof can be separately set by the user in a setting screen (not illustrated). When an "OK" button 704 is pressed, the content set in the hot folder setting display screen 700 is stored in the hot folder setting information DB 401.

Hot Folder Management Screen

Figure 8:
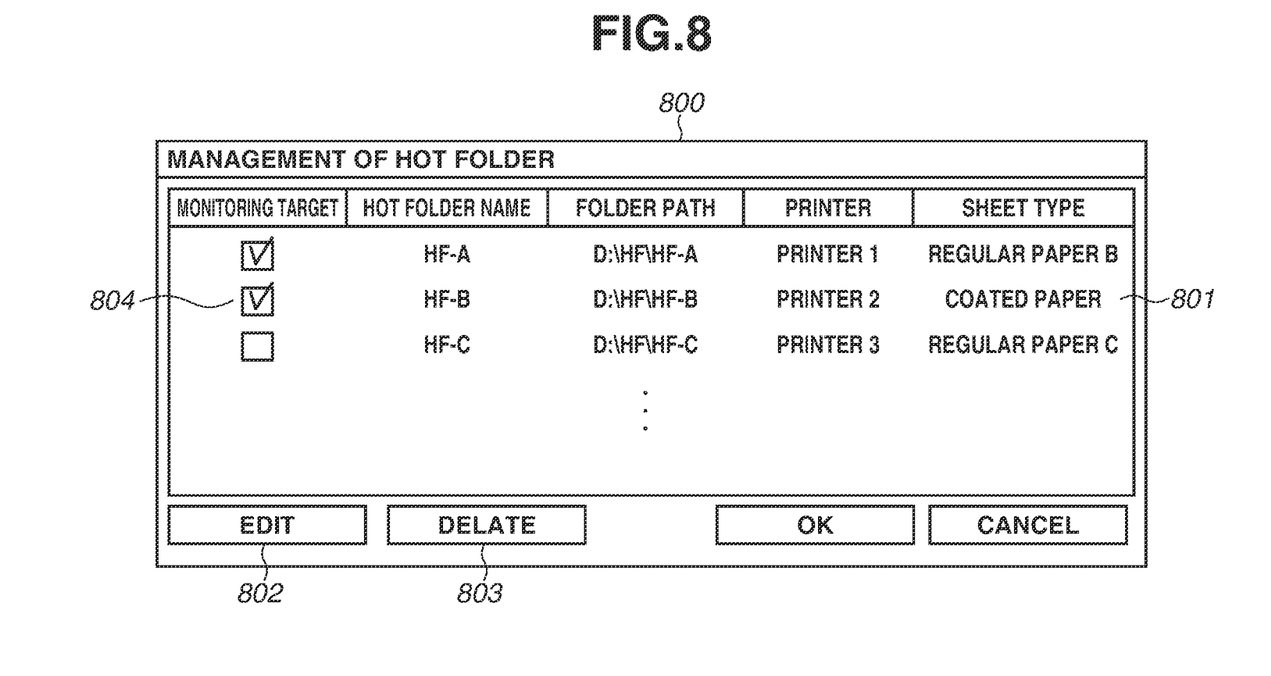
FIG. 8 is a diagram illustrating an example of a hot folder management screen on the PC.

FIG. 8 illustrates an example of a hot folder management screen 800 relating to the image forming apparatus 100 displayed by the hot folder setting information display unit 405 on the display 309 of the PC 101.

In the hot folder management screen 800, the information stored in the hot folder setting information DB 401 is displayed in a hot folder list 801. When a hot folder is selected from the displayed hot folder list 801, and an "edit" button 802 is pressed, the hot folder setting display screen 700 is then displayed to allow the user to change the hot folder setting. When a "delate" button 803 is pressed, the selected item can be delated from the hot folder setting information DB 401. When a monitoring target check box 804 is checked, the corresponding hot folder 408 can be set as a monitoring target. When the monitoring target check box 804 is unchecked, the corresponding hot folder 408 can be excluded from the monitoring targets while the hot folder setting information is remained in the hot folder setting information DB 401.

Hot Folder Setting Information DB

FIG. 9 illustrates an example of the information stored in the hot folder setting information DB 401. The information includes items of a hot folder name 900, a printer name 901, a sheet feeding port 902, a sheet width 903, the sheet type 904, the sheet category 905, a hot folder path 906, and the allowable range expansion flag 907. When the allowable range expansion flag 907 is turned on, the user is allowed to change the settings of the hot folder within predetermined ranges. In this case, even when the settings of the hot folder and the settings of the printer are not coincident with each other, the setting values of the hot folder are changed so as to be coincident with the setting values of the printer within the separately set allowable ranges of the respective items, and then a print job is generated and transmitted.

The above-described items are illustrative, and only some of the items may be held or more setting parameters may be held. Further, the parameters may be managed in different files for respective types.

Processing for Acquiring Print Setting Information

Figure 10:
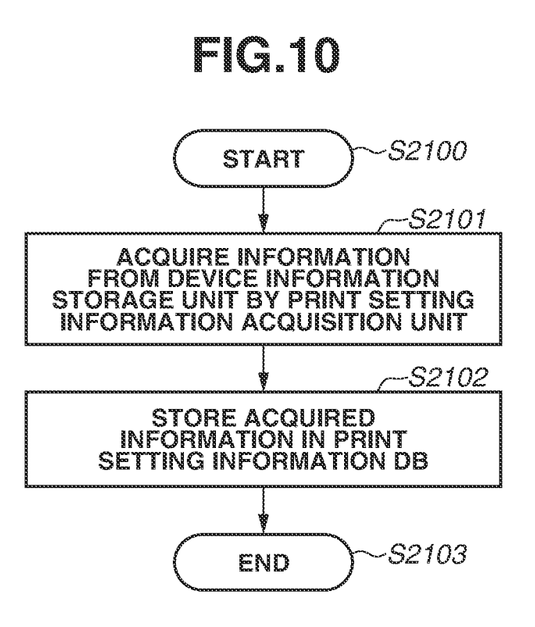
FIG. 10 is a flowchart for creating information to be recorded in the print setting information DB.

FIG. 10 is a diagram illustrating an example of a flow of processing performed by the PC 101 to acquire the print setting information from the image forming apparatus 100. The print setting information acquisition unit 402 of the PC 101 communicates with the image forming apparatus designated in the printer selection field 605 of the print setting display field 603, via the network 102, and acquires the print setting information. The processing is implemented when the CPU 300 of the PC 101 loads programs stored in the storage unit such as the ROM 301 to the RAM 302, and executes the programs.

In step S2100, the processing starts. In step S2101, the print setting information acquisition unit 402 of the PC 101 communicates with the device information storage unit 409 of the image forming apparatus 100, and acquires the print setting information of the image forming apparatus 100. In a case where the print setting information acquisition unit 402 cannot immediately communicate with the device information storage unit 409 in step S2101, the print setting information acquisition unit 402 may wait for a predetermined time and retry a plurality of times until the communication is enabled.

Next, in step S2102, the print setting information acquisition unit 402 stores the acquired information in the print setting information DB 400. In step S2103, the processing ends.

Hot Folder Print Processing

Figure 11:
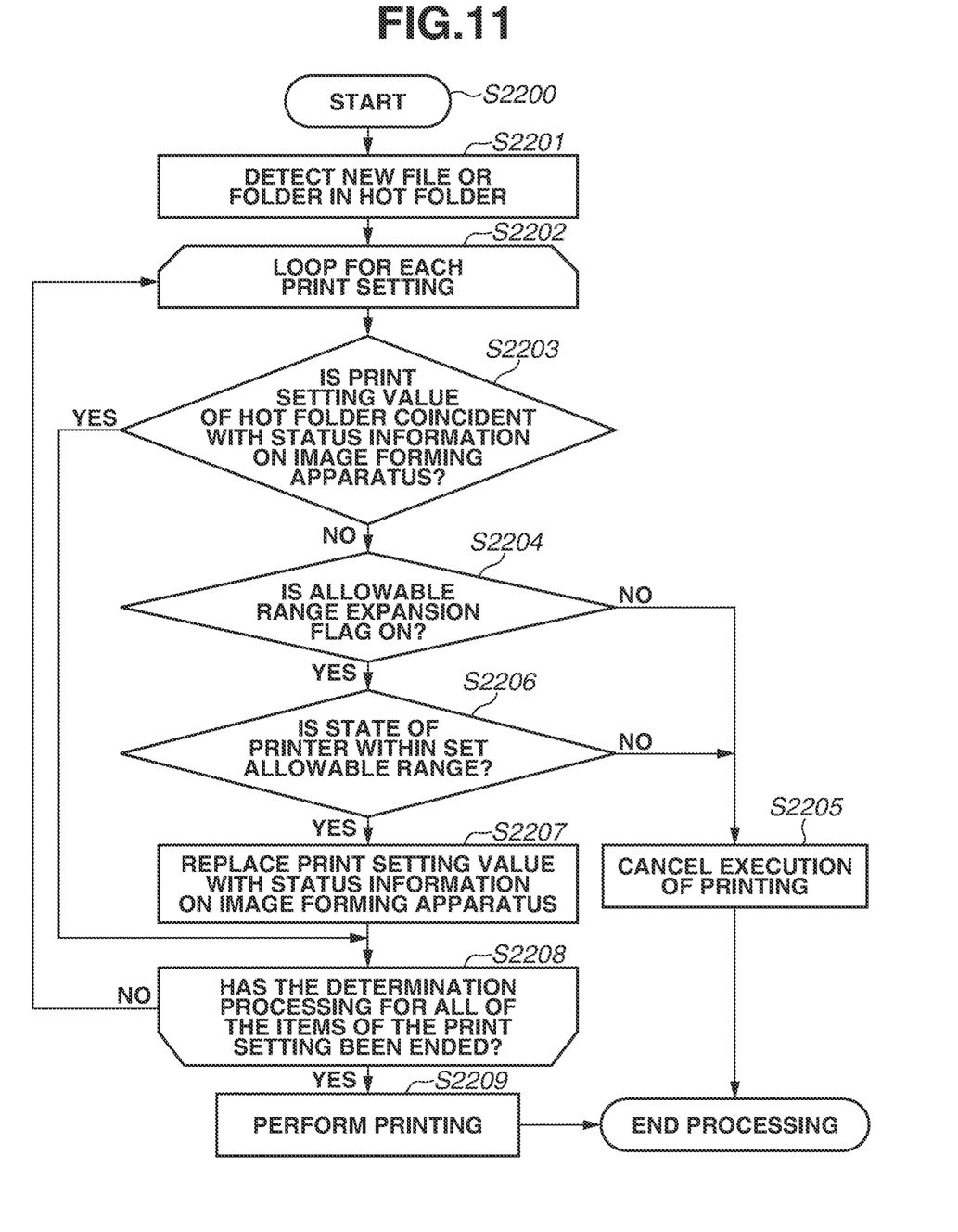
FIG. 11 is a flowchart for creating and transmitting a print job by a print job transmission unit.

FIG. 11 is a diagram illustrating a flow of processing performed by the hot folder monitoring unit 407 of the PC 101 to monitor the state of the hot folder 408 and to perform printing based on the information stored in the hot folder setting information DB 401. The processing is implemented when the CPU 300 of the PC 101 loads programs stored in the storage unit such as the ROM 301 to the RAM 302, and executes the programs.

In this processing, in a case where the hot folder monitoring unit 407 confirms there is a new file or folder to be processed in the hot folder 408 in accordance with the flow of processing, the hot folder monitoring unit 407 instructs the print job transmission unit 406 to create and transmit a print job.

In step S2200, the processing starts in a case where the hot folder monitoring unit 407 periodically monitors the inside of the hot folder 408, and newly finds a file.

In step S2201, the hot folder monitoring unit 407 detects presence of a new file or folder inside the hot folder 408.

In the following, loop processing from step S2202 to step S2208 is performed for each of the items of the print setting 702.

First, in step S2203, the print setting information comparison unit 403 compares the print setting value (hot folder setting information DB 401) of the hot folder 408 where the new file has been detected, with the status information (print setting information DB 400) about the image forming apparatus having the same printer name. Thereafter, the print setting information comparison unit 403 determines whether the print setting value of the hot folder 408 and the status information about the image forming apparatus are coincident with each other. In a case where the print setting value of the hot folder 408 and the status information about the image forming apparatus are coincident with each other (YES in step S2203), the processing proceeds to step S2208. In a case where the print setting value of the hot folder 408 and the status information on the image forming apparatus are not coincident with each other (NO in step S2203), the processing proceeds to step S2204.

In step S2204, the print setting information comparison unit 403 determines whether the allowable range expansion flag 907 of the hot folder setting information DB 401 is ON. In a case where the allowable range expansion flag 907 is not ON (NO in step S2204), the file is determined to be unsuitable for execution of the printing, and the processing proceeds to step S2205. In a case where the allowable range expansion flag 907 is ON (YES in step S2204), the processing proceeds to step S2206.

In step S2205, execution of the printing is canceled, and the processing ends.

In step S2206, the print setting information comparison unit 403 determines whether the state of the image forming apparatus is within the set allowable range. In a case where the state of the image forming apparatus is within the set allowable range (YES in step S2206), the processing proceeds to step S2207. In a case where the state of the image forming apparatus is not within the set allowable range (NO in step S2206), the processing proceeds to step S2205.

In step S2207, the print setting value of the corresponding hot folder stored in the hot folder setting information DB 401 is replaced with the status information (print setting) about the same image forming apparatus stored in the print setting information DB 400, to enable printing.

In step S2208, it is determined whether the determination processing for all of the items of the print setting has been ended. In a case where the processing for all of the items has not been ended, the processing returns to step S2202, and the processing up to step S2207 is repeated. In a case where the processing for all of the items of the print setting has been completed, the processing exits from the processing loop, and proceeds to step S2209.

In step S2209, the print job transmission unit 406 creates a print job using the print setting value replaced in step S2207, and transmits the print job to the image forming apparatus 100. Thereafter, the print processing is performed in the image forming apparatus 100. Thereafter, the processing ends.

In a case where the print setting information on the image forming apparatus cannot be acquired in the flow of processing in FIG. 10 due to any abnormality, a print job may be generated and the printing may be performed without performing the processing relating to the allowable range in steps S2202 to S2208. Further, among the plurality of items of the print setting to be determined in step S2202, only a part of the items of the print setting may be automatically changed within the respective allowable ranges. In this case, the determination in steps S2204 and S2206 may be performed only in the loop relating to the part of the items of the print setting. More specifically, in the loop relating to an item other than the part of the items of the print setting, in a case where the determination result in step S2203 is NO, the processing may proceed to step S2205 without performing the determination in steps S2204 and S2206. The part of the items of the print setting is, for example, the sheet type, and the item other than the part of the items of the print setting is, for example, a sheet feeding method or a name of the printer performing printing (i.e., as output destination).

Specific Example of Determination Processing

A determination procedure in the flow of processing in FIG. 11 in a case where "sheet type" is set as the item of the print setting and "sheet category" indicating the allowable range is set to the same print setting value in the above-described flow of processing is described.

In step S2203, it is determined whether the sheet types are coincident with each other as the item of the print setting.

A case where the print setting information DB 400 of the image forming apparatus 100 includes the information illustrated in FIG. 5 and the hot folder setting information includes the information illustrated in FIG. 9 is described. In a case where the hot folder name 900 in FIG. 9 is "HF-A", the printer name 901 is "printer 1" and the sheet type 904 is "regular sheet B". On the other hand, in the corresponding print setting information DB 400 in FIG. 5, in a case where the ID 500 is "ID-A", the printer name 501 is "printer 1", and the sheet type 504 is "regular sheet A". Therefore, it is determined that the sheet types are not coincident with each other (NO in step S2203), and the processing proceeds to step S2204.

In step S2204, the allowable range expansion flag 907 is set to "ON" (YES in step S2204) in the case where the hot folder name is "HF-A" in FIG. 9. Thus, the processing proceeds to step S2206.

In this example, the item of the print setting is "sheet type" 504, and if the sheet category 505 is set to the same print setting value as that of the sheet category 905, "sheet type" 504 is determined to be within the allowable range.

In the case where the ID 500 is "ID-A" in the print setting information DB 400, the sheet type 504 is "regular sheet A" and the sheet category 505 is "regular sheet". On the other hand, in the case where the hot folder name is "HF-A" in the hot folder setting information DB 401, the sheet type 904 is "regular sheet B" and the sheet category 905 is "regular sheet".

Accordingly, in step S2206, it is determined that the setting is within the allowable range because the sheet categories are coincident with each other, and the processing proceeds to step S2207.

In step S2207, the print setting value set as the sheet type of the print job is changed to "regular sheet A" corresponding to the state of the image forming apparatus.

In the above-described manner, the print setting value of the print job is changed within the allowable range of the hot folder to be coincident with the state of the image forming apparatus so that printing is enabled.

In step S2205, execution of the printing is canceled; however, instead of canceling the printing, the processing may return to step S2202, and the processing may wait until the state of the image forming apparatus and the setting information on the hot folder become coincident with each other. For example, the processing may wait until "sheet types" are coincident with each other or "sheet types" is within the allowable range when the user changes the sheet.

As another example of the print setting, a case where the print setting item is "sheet size" and "reduction rate of image" is set as the allowable range is described. An output image size and a sheet size acquired from the image forming apparatus are compared. In a case where the image size is greater than the sheet size but the image size after reduction at the reduction rate of the image is within the allowable range, the image may be reduced and the printing may be performed.

Further, as yet another example of the print setting, a case where the print setting item relates to a color configuration of ink or toner of the image forming apparatus, and a plurality of image forming apparatus as output destinations is set as the allowable range is described. Output colors of the hot folder and the color configuration (e.g., colors CMYK) of the image forming apparatus are compared. In a case where the output colors and the color configuration of the image forming apparatus are different from each other, an image forming apparatus that supports the output colors is selected as an output destination. As for the other items of the print setting, if an image forming apparatus that is within the allowable range is set as the output destination, execution of printing is enabled.

The determination method is not limited to these examples, and another determination method may be used or a plurality of determination methods may be combined and used for the determination. Further, when a file is input to the hot folder, the allowable ranges for each job may be designated in a separate file.

Further, there is a case where a plurality of hot folders is associated with the same image forming apparatus, and the plurality of hot folders can be combined into a single hot folder by setting an allowable range to a specific print setting item for each of the plurality of hot folders. In such a case, a function of setting an allowable range to each of a plurality of hot folders that are similar to each other and automatically unifying the hot folders is provided as a tool, and the tool is performed as appropriate. This makes it possible to construct an environment where the hot folders can be organized.

In the first exemplary embodiment, in the flow of processing in FIG. 10, the information stored in the device information storage unit 409 is acquired by the print setting information acquisition unit 402 in step S2101. In a second exemplary embodiment, a case where the print setting information acquisition unit 402 fails to acquire the information stored in the device information storage unit 409 in step S2101 is described.

The print setting information acquisition unit 402 changes access authority of the hot folder associated with the image forming apparatus 100 as an acquisition target so that writing to the hot folder is not allowed. In a case where acquisition of the information stored in the device information storage unit 409 is successful, the print setting information acquisition unit 402 changes the access authority of the hot folder to allow writing to the hot folder. In a case where acquisition of the information on the image forming apparatus is failed, i.e., in a case where a possibility that the print execution is failed is extremely high, this configuration can prevent the user from inputting a file to the hot folder in advance. Therefore, it is possible to suppress print failures.

Further, not only in the case where the print setting information on the image forming apparatus 100 cannot be acquired, but also in a case where printing cannot be performed due to running out of paper in the image forming apparatus 100 or the like, writing to the hot folder associated with the image forming apparatus may be restricted as in the cases described above.

In the above-described method, the access authority of the hot folder is changed so that writing to the hot folder is restricted. Alternatively, when a file is input to the folder, an error notification may be immediately presented to the user while writing to the hot folder is allowed. By notifying the user of the error when a file is input to the hot folder as described above, the user can notice in advance that the file will not be printed and remain in the hot folder.

OTHER EMBODIMENTS

The present disclosure can also be achieved by the process of supplying a program for implementing one or more functions of the above exemplary embodiments to a system or an apparatus via a network or a storage medium, and of causing one or more processors of a computer of the system or the apparatus to read and execute the program. Further, the present disclosure can also be achieved by a circuit (e.g., an application-specific integrated circuit (ASIC)) for implementing the one or more functions.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-077297, filed May 10, 2022, which is hereby incorporated by reference herein in its entirety.

What is claimed is:

1. A method of controlling an information processing apparatus, the method comprising:
setting content of a plurality of print setting items to a predetermined folder;
acquiring information about an image forming apparatus;
performing processing to cause the image forming apparatus to perform printing based on the content of the plurality of print setting items set to the predetermined folder and based on a file in the predetermined folder; and
enabling one of a first setting and a second setting based on user operation, the first setting allowing, in a case where content of at least one of the plurality of print setting items set to the predetermined folder is first content, and content corresponding to the acquired information about the image forming apparatus and corresponding to the at least one print setting item is second content different from the first content, the image forming apparatus to perform printing based on the second content and based on the file in the predetermined folder, the second setting not allowing, in a case where the content of the at least one print setting item is the first content, and the content corresponding to the acquired information about the image forming apparatus and corresponding to the at least one print setting item is the second content, the image forming apparatus to perform the printing based on the second content and based on the file in the predetermined folder,
wherein the first setting allows, in a case where the content of the at least one print setting item set to the predetermined folder is the first content and the content corresponding to the acquired information about the image forming apparatus and corresponding to the at least one print setting item is the second content, the image forming apparatus to perform the printing based on the second content and based on the file in the predetermined folder, but does not allow, in a case where content of a print setting item, different from the at least one print setting item, set to the predetermined folder is fourth content, and the content corresponding to the acquired information about the image forming apparatus and corresponding to the print setting item different from the at least one print setting item is fifth content different from the fourth content, the image forming apparatus to perform printing based on the fifth content and based on the file in the predetermined folder.

2. The method of controlling the information processing apparatus according to claim 1, wherein the first setting allows, in a case where the content of the at least one print setting item set to the predetermined folder is the first content, and the content corresponding to the acquired information about the image forming apparatus and corresponding to the at least one print setting item is the second content, the image forming apparatus to perform the printing based on the second content and based on the file in the predetermined folder, but does not allow, in a case where the content of the at least one setting item set to the predetermined folder is the first content, and the content corresponding to the acquired information about the image forming apparatus and corresponding to the at least one print setting item is third content different from the first content and the second content, the image forming apparatus to perform printing based on the third content and based on the file in the predetermined folder.

3. The method of controlling the information processing apparatus according to claim 2,
    wherein a category of the first content and a category of the second content are identical to each other, and
    wherein the category of the first content and a category of the third content are different from each other.

4. The method of controlling the information processing apparatus according to claim 2,
    wherein the at least one print setting item is an item about a sheet type,
    wherein the first content is content indicating a first sheet that is regular paper,
    wherein the second content is content indicating a second sheet that is regular paper different from the first sheet, and
    wherein the third content is content indicating a third sheet that is not regular paper.

5. The method of controlling the information processing apparatus according to claim 4, wherein the third sheet is coated paper.

6. The method of controlling the information processing apparatus according to claim 1, wherein the second setting allows the image forming apparatus to perform the printing based on the file in the predetermined folder only in a case where the content of the at least one print setting item set to the predetermined folder is the first content, and the content corresponding to the acquired information about the image forming apparatus and corresponding to the at least one print setting item is the first content.

7. The method of controlling the information processing apparatus according to claim 6, wherein the information about the image forming apparatus includes information about a type of sheet held by the image forming apparatus.

8. The method of controlling the information processing apparatus according to claim 1, wherein the at least one print setting item is an item about a sheet type.

9. The method of controlling the information processing apparatus according to claim 1, wherein the plurality of print setting items includes at least one of an item about a name of the image forming apparatus performing printing, an item about a sheet feeding port, and an item about a sheet type.

10. The method of controlling the information processing apparatus according to claim 1,
    wherein the at least one print setting item is an item about a sheet type, and
    wherein the print setting item different from the at least one print setting item is at least one of an item about a sheet feeding method and an item about a name of the image forming apparatus performing printing.

11. The method of controlling the information processing apparatus according to claim 1, further comprising performing control to restrict writing to the predetermined folder associated with the image forming apparatus in at least one of a state where the information about the image forming apparatus is not acquirable and a state where printing is not performable by the image forming apparatus.

12. The method of controlling the information processing apparatus according to claim 1, further comprising performing control to notify an error in a case where a file is input to the predetermined folder associated with the image forming apparatus in at least one of a state where the information about the image forming apparatus is not acquirable and a state where printing is not performable by the image forming apparatus.

13. The method of controlling the information processing apparatus according to claim 1, wherein the image forming apparatus is an apparatus configured to feed roll paper.

14. The method of controlling the information processing apparatus according to claim 1, wherein the processing to cause the image forming apparatus to perform printing based on the file in the predetermined folder includes at least one of processing to generate a print job causing the image forming apparatus to perform the printing based on the file in the predetermined folder and processing to transmit the print job.

15. An information processing apparatus, comprising:
    a setting unit configured to set content of a plurality of print setting items to a predetermined folder;
    an acquisition unit configured to acquire information about an image forming apparatus;
    a processing unit configured to perform processing to cause the image forming apparatus to perform printing based on the content of the plurality of print setting items set to the predetermined folder and based on a file in the predetermined folder; and
    an enabling unit configured to enable one of a first setting and a second setting based on user operation, the first setting allowing, in a case where a content of at least one of the plurality of print setting items set to the predetermined folder is first content, and content corresponding to the acquired information about the image forming apparatus and corresponding to the at least one print setting item is second content different from the first content, the image forming apparatus to perform printing based on the second content and based on the file in the predetermined folder, the second setting not allowing, in a case where the content of the at least one print setting item is the first content, and the content corresponding to the acquired information about the image forming apparatus and corresponding to the at least one print setting item is the second content, the image forming apparatus to perform the printing based on the second content and based on the file in the predetermined folder,
    wherein the first setting allows, in a case where the content of the at least one print setting item set to the predetermined folder is the first content and the content corresponding to the acquired information about the image forming apparatus and corresponding to the at least one print setting item is the second content, the image forming apparatus to perform the printing based on the second content and based on the file in the predetermined folder, but does not allow, in a case where content of a print setting item, different from the at least one print setting item, set to the predetermined folder is fourth content, and the content corresponding to the acquired information about the image forming apparatus and corresponding to the print setting item different from the at least one print setting item is fifth content different from the fourth content, the image forming apparatus to perform printing based on the fifth content and based on the file in the predetermined folder.

16. A non-transitory computer-readable storage medium that stores a program for causing a computer to execute a method of controlling an information processing apparatus, the method comprising:

setting content of a plurality of print setting items to a predetermined folder;

acquiring information about an image forming apparatus;

performing processing to cause the image forming apparatus to perform printing based on the content of the plurality of print setting items set to the predetermined folder and based on a file in the predetermined folder; and enabling one of a first setting and a second setting based on user operation, the first setting allowing, in a case where content of at least one of the plurality of print setting items set to the predetermined folder is first content, and content corresponding to the acquired information about the image forming apparatus and corresponding to the at least one print setting item is second content different from the first content, the image forming apparatus to perform printing based on the second content and based on the file in the predetermined folder, the second setting not allowing, in a case where the content of the at least one print setting item is the first content, and the content corresponding to the acquired information about the image forming apparatus and corresponding to the at least one print setting item is the second content, the image forming apparatus to perform the printing based on the second content and based on the file in the predetermined folder, wherein the first setting allows, in a case where the content of the at least one print setting item set to the predetermined folder is the first content and the content corresponding to the acquired information about the image forming apparatus and corresponding to the at least one print setting item is the second content, the image forming apparatus to perform the printing based on the second content and based on the file in the predetermined folder, but does not allow, in a case where content of a print setting item, different from the at least one print setting item, set to the predetermined folder is fourth content, and the content corresponding to the acquired information about the image forming apparatus and corresponding to the print setting item different from the at least one print setting item is fifth content different from the fourth content, the image forming apparatus to perform printing based on the fifth content and based on the file in the predetermined folder.

* * * * *